United States Patent [19]
Velie et al.

[11] Patent Number: 5,799,681
[45] Date of Patent: Sep. 1, 1998

[54] SAFETY SHUT OFF VALVE AND METHOD OF AUTOMATIC FLOW RESTORATION

[75] Inventors: Wallace W. Velie, deceased, late of Alta Loma; Neil Velie, executor, Thousand Oaks, both of Calif.

[73] Assignee: Mallard Products, Inc., Thousand Oaks, Calif.

[21] Appl. No.: 856,388

[22] Filed: May 14, 1997

[51] Int. Cl.$^6$ .............................. G05B 27/00; E03B 1/00
[52] U.S. Cl. .................... 137/1; 251/65; 137/38
[58] Field of Search .................. 137/1, 38, 39, 137/43; 251/65

[56] References Cited

U.S. PATENT DOCUMENTS

| | | |
|---|---|---|
| 2,215,044 | 9/1940 | Kammerdiner . |
| 2,569,316 | 9/1951 | Jerman . |
| 2,585,316 | 2/1952 | Hobson . |
| 2,949,931 | 8/1960 | Ruppright . |
| 3,087,761 | 4/1963 | Stelzer ............................ 251/65 |
| 3,747,616 | 7/1973 | Lloyd . |
| 3,779,262 | 12/1973 | Manning ......................... 137/38 |
| 4,212,313 | 7/1980 | Winters . |
| 4,245,814 | 1/1981 | Shimizu . |
| 4,382,449 | 5/1983 | Nelson . |
| 4,485,832 | 12/1984 | Plemmons et al. . |
| 4,565,208 | 1/1986 | Ritchie et al. . |
| 4,640,303 | 2/1987 | Greenberg ...................... 251/65 |
| 4,715,394 | 12/1987 | O'Donnell et al. . |
| 4,764,046 | 8/1988 | Kitamura ........................ 137/43 |
| 4,785,842 | 11/1988 | Johnson, Jr. . |
| 4,844,113 | 7/1989 | Jones . |
| 4,874,012 | 10/1989 | Velie . |
| 4,960,146 | 10/1990 | Morris ............................ 251/65 |
| 5,010,916 | 4/1991 | Albrecht . |
| 5,052,429 | 10/1991 | Yoo . |
| 5,074,327 | 12/1991 | Reid .............................. 251/65 |
| 5,119,841 | 6/1992 | McGill . |
| 5,203,365 | 4/1993 | Velie . |
| 5,209,454 | 5/1993 | Engdahl ......................... 251/65 |
| 5,409,031 | 4/1995 | McGill et al. . |
| 5,603,345 | 2/1997 | Franklin et al. . |
| 5,704,385 | 1/1998 | McGill ........................... 251/65 |

FOREIGN PATENT DOCUMENTS 1321991  9/1989  Canada .

*Primary Examiner*—Denise L. Ferensic
*Assistant Examiner*—Ramyar Farid
*Attorney, Agent, or Firm*—Oppenheimer Wolfe & Donnelly LLP

[57] ABSTRACT

An safety shut off valve automatically shuts off in response to seismic or other shock wave forces of a predetermined magnitude and thereafter automatically reset when there is no discernible excess gas flow due a downstream broken or leaking pipe. The shut off valve generally includes a housing having a mass spring system mounted therein for translating lateral seismic and other shock forces exerted against the housing to an axially movable magnet for decoupling a valve member plate attracted thereto allowing it to block the downstream fluid communication path. A small bypass flow permits the valve member plate to be automatically reset in engagement with the magnet when the atmospheric pressure upstream of the plate is substantially equal to the atmospheric pressure downstream of the plate.

14 Claims, 1 Drawing Sheet

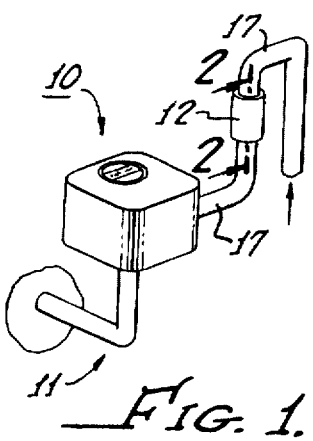
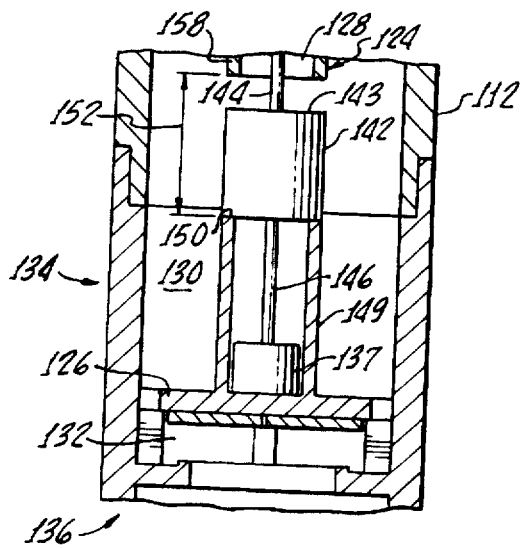
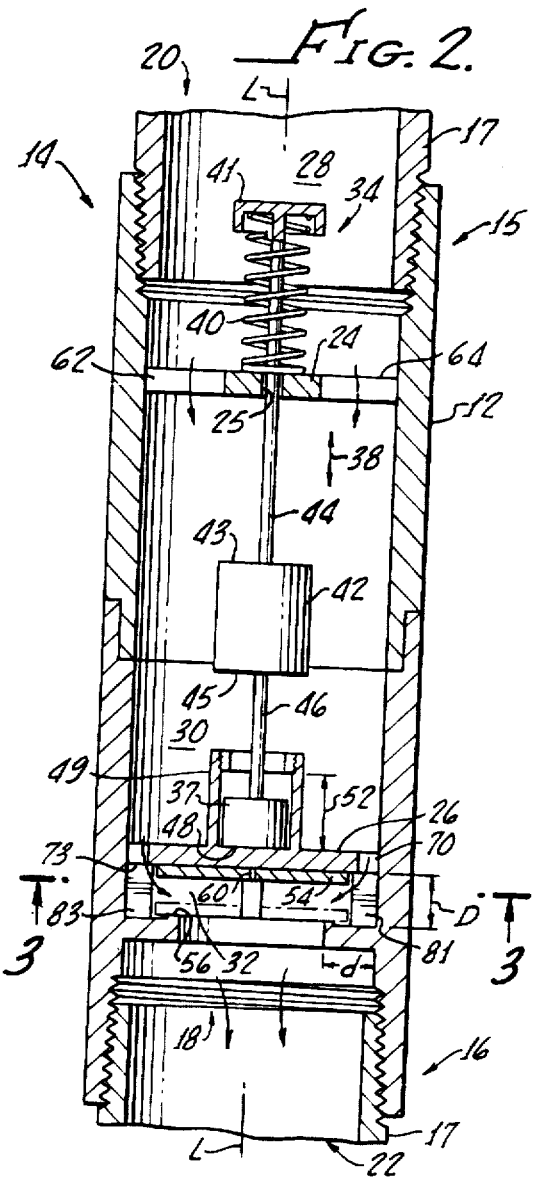
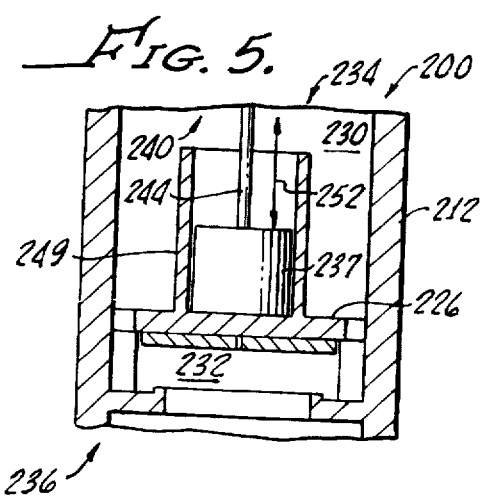
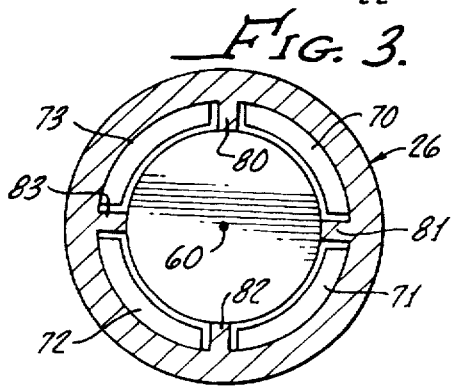

ABSTRACT
SAFETY SHUT OFF VALVE AND METHOD OF AUTOMATIC FLOW RESTORATION

TECHNICAL FIELD

The present invention relates in general to an improved safety valve and a method of using it to control the flow of a fluid. The invention more particularly relates to a safety shut off valve which provides vibration and excess flow protection and which automatically reset following a seismic disturbance in the absence of any downstream fluid leakage according to a novel automatic resetting method.

BACKGROUND ART

There have been many different types and kinds of valves used to facilitate the controlling of fluid flow in the event of unwanted and undesired downstream leakage. For example reference may be made to the following U.S. Pat. Nos.: 2,215,044; 2,569,316; 2,585,316; 2,949,931; 3,747,616; 4,212,313; 4,245,814; 4,382,449; 4,485,832; 4,565,208; 4,715,394; 4,785,842; 4,844,113; 4,874,012; 5,010,916; 5,052,429; 5,119,841; 5,203,365 5,409,031 and 5,603,345.

Seismic responsive shut off valves have been encouraged in certain parts of the United States and other parts of the world for fluid delivery systems in both residential and commercial settings. In this regard, the function of such a safety shut off valve is to interrupt the flow of gas, generally at the meter, whenever a sizable perturbation in stability occurs to facilitate the prevention of explosions and fires caused by gas leakage through broken or damaged downstream pipes.

The typical seismic responsive shut off valve however, is only sensitive to seismic shock wave and other shock forces for fluid shut off purposes and is not otherwise concerned with sensing excess flow for providing excess flow protection. Flow protection valves on the other hand, are only sensitive to excess flow conditions and are not otherwise concerned with shutting off gas flow during sizable perturbations in stability.

Therefore it would be highly desirable to have a new and improved safety shut off valve which provides shut off capabilities for both seismic vibrations of a predetermined magnitude as well as excess flow protection.

A typical shut off valve responsive to seismic movements generally includes a ball or plate that falls into a fluid communication path during a seismic occurrence to block the fluid passageway. The ball or plate must thereafter must be manually reset to once again restore the normal fluid flow.

While such a valve may shut off the flow of fluids in the event of a large or sizable perturbation in stability, such a valve has not proven to be entirely satisfactory. In this regard, before the value can be reset, there must be an inspection of the fluid delivery system downstream of the value for possible damage. The valve therefore must not be reset until an assessment of downstream pipe breakage and leakage has been completed and repaired by a trained technician. Then, and only then, may the valve be manually reset. Therefore, even if there is no pipe damage or leakage, a skilled technician must nevertheless be called out to reset the valve. Such activities overtly increase the responsibility of the fluid supplier and can place an extraordinary demand on the resources of the supplier to restore services after the occurrence of an earthquake of any sufficient magnitude to cause a valve shut off condition.

Therefore it would be highly desirable to have a new and improved safety shut off valve that interrupts fluid flow during sizable perturbations in stability and that automatically resets to restore normal fluid flow without the need of a trained and qualified technician performing an assessment to determine whether there is a downstream broken or leaking pipe. Such a valve should also be easy to install and be relative inexpensive to manufacture.

SUMMARY OF INVENTION

Therefore the principal object of the present invention is to provide a new and improved safety shut off valve which provides shut off capabilities for both seismic vibrations of a predetermined magnitude as well as excess flow protection.

Another object of the present invention is to provide such a new and improved safety shut off valve that interrupts fluid flow during sizable perturbations in stability and that automatically resets to restore normal fluid flow without the need of an assessment by a trained and qualified technician for determining whether there is a downstream broken or leaking pipe.

Another object of the present invention is to provide such a new and improved earthquake and shut off valve that is easy to install and that is relatively inexpensive to manufacture.

Briefly, the above and further objects of the present invention are realized by providing a new and improved safety shut off valve which automatically shuts off in response to seismic or other shock wave forces a predetermined magnitude and thereafter automatically reset when there is no discernible excess gas flow due a downstream broken or leaking pipe.

The earthquake shut off valve generally includes a housing adapted to be fixed in line within an existing gas delivery system having a mass spring system mounted therein for translating lateral seismic and other shock forces exerted against the housing to an axially movable magnet for decoupling a valve member plate attracted thereto allowing it to block the downstream fluid communication path. A small bypass flow permits the valve member plate to be automatically reset in engagement with the magnet with the atmospheric pressure across the plate is equalized.

BRIEF DESCRIPTION OF DRAWINGS

The above-mentioned and other objects and features of this invention and the manner of attaining them will become apparent, and the invention itself will be best understood by reference to the following description of an embodiment of the invention taken in conjunction with the accompanying drawings, wherein:

FIG. 1 is a pictorial view of a safety shut off valve assembly which is constructed in accordance with the present invention;

FIG. 2 is an enlarged sectional elevational view of the valve assembly of FIG. 1, taken substantially on line 2—2 thereof;

FIG. 3 is a sectional view of the valve assembly of FIG. 2, taken substantially on line 3—3 thereof;

FIG. 4 is a fragmentary sectional elevational view of another safety shut off valve assembly which is constructed in accordance with the present invention; and FIG. 5 is a fragmentary sectional elevational view of another safety shut off valve assembly which is constructed in accordance with the present invention.

DESCRIPTION OF THE PREFERRED EMBODIMENT

Referring now to the drawings and more particularly to FIG. 1 thereof, there is shown a safety shut off valve assembly 10 which is constructed in accordance with the present invention. The shut off valve assembly 10 is adapted to be mounted in line in a fluid delivery system 11 in an upright or vertical orientation for substantially preventing the flow of fluid downstream therefrom when the assembly 10 is subjected to seismic or vibrational shockwave forces of a predetermined magnitude. The shut off valve assembly 10 upon the subsidence of the seismic forces automatically resets itself to restore fluid flow in accordance with the method of the present invention.

The shut off valve assembly 10 generally comprises an elongated hollow housing member 12 and a shut off valve arrangement 14 which is disposed within the hollow interior of the housing member 12. The housing 12 is hollow throughout its entire length having an interior wall 13 that is generally cylindrical shape for coupling the valve assembly 10 in line with a conventional threaded pipeline, such as a gas pipeline 17. Both ends of the housing 12, are internally threaded at about 15 and 16 respectively to permit the shut off valve assembly 10 to be easily installed in an upright manner at any convenient location in the fluid delivery system. In this regard, the assembly 10 is installed in the fluid delivery system 11 in the same convenient manner as a conventional pipe coupling.

Although in the preferred embodiment of the present invention the housing 12 is described as having internal threads, those skilled in the art will understand that external threads or a combination of internal and external threads may be employed.

The housing member 12 defines an elongated fluid communication path indicated generally at 18 that extends between an inlet 20 that receives upstream fluids from the fluid delivery system 11 and an outlet 22 that discharges the received fluids downstream into the fluid delivery system 11.

In order strengthen the housing member 12 against lateral and omni directional forces created by a seismic disturbance, the interior of the housing is divided into a set of chambers by an upstream web member 24 and a downstream web member 26. The upstream web member 24 is integrally connected to the interior wall 13 of the housing 12 and has an annular shape that reinforces the interior wall 13 of the housing 12. The upstream web member 24 is spaced from the inlet 20 a sufficient distance to define an inlet or spring receiving chamber 28 that is in fluid communication with the upstream fluids being delivery by the fluid delivery system 11.

The downstream web member 26, is spaced from the upstream web member 24 and the outlet 22 and helps to define an interior or magnet chamber 30 and an outlet or valve seat chamber 32, each being in fluid communication with the inlet chamber 28. The downstream web member 26 is annular shaped and integrally connected to interior wall 13 of the housing member 12 for wall reinforcement purposes.

The shut off valve arrangement 14 includes two basic components a translation assembly 34 and a magnetically actuated valve assembly 36. The translation assembly 34 responds to seismic induced lateral and omni directional vibrational forces by generating an oscillatory force along a rectilinear path of travel 38 that extends along the longitudinal axis (L) of the housing member 12, which in turn, causes a magnet 37 to move in an oscillatory manner away from and toward the downstream web member 26. In this regard, whenever the seismic force exceeds a predetermined magnitude, the translation assembly 34 will cause the magnet 37 to move a sufficient distance away from the downstream web member 26 to enable the valve assembly 36 to be actuated from an open position to a close position as best seen in FIG. 2, to effect blockage of the fluid communication path 18.

Following the seismic disturbance, the valve assembly 36 responds to the attracting forces generated by the magnetic flux of the magnet 37 and automatically reset to its normally open position so long as downstream pressure in the fluid delivery system is substantially the same as the upstream pressure in the fluid delivery system. If there is a pressure differential between the upstream pressure and the downstream pressure, the valve assembly 36 will not reset but instead will remain in a closed position until the pressure differential is equalized. Once the pressure is equalized, the valve assembly 36 automatically reset to the normally open position.

In operation, whenever a lateral force is exerted against the shut off valve assembly 10 by a seismic disturbance, the seismic force is coupled to the translation assembly 34 and the valve assembly 36 via the housing member 12. The translation assembly 34 responds to the seismic force by converting the lateral displacement of the housing member 12 into an oscillatory force that moves along the rectilinear path 38 coextending in part with the longitudinal axis (L) of the housing member 12. The vertically directed force generated by the translation assembly 34 is coupled to the magnet 37, which in turn, moves away from and toward the downstream web member 26. As the natural frequency of the translation assembly 34 and seismic disturbance move toward synchronization, the vertical displacement of the magnet 36 from the downstream web member 26 becomes greater and greater until the distance from the magnet 37 and the downstream web member 26 is sufficiently great to enable the valve assembly 36 to actuate from its normally open position to the closed position as best seen in FIG. 2.

Once the seismic disturbance has subsided, the translation assembly 34 causes the magnet 37 to be moved into engagement with the downstream web member 26 so that the magnet 37 can exert a sufficient attracting force against the valve assembly 36 to causes it to move from its closed position to its normally open position in the absence of any pressure differential between the fluid delivery system downstream of the valve assembly 10 and the fluid delivery system upstream of the valve assembly 10. In the event the seismic disturbance has cause pipe breakage downstream or in the event there is leak of sufficient volume to create a pressure differential, the resulting force exerted by the pressure differential across the valve assembly 36 via a small by-pass hole 60 is sufficient to prevent the valve assembly 36 to be restored to its normally open position. The valve assembly 36 will therefore remain in the closed position until the upstream and downstream pressure have been equalized relative to the valve assembly 10.

From the foregoing it should be understood by those skilled in the art that the safety shut off valve assembly 10 also functions as an excess flow check valve whenever a pressure differential of sufficient magnitude to overcome the attracting force of the magnet 37 relative to the valve assembly 36 established. More specifically, whenever the fluid drag force on the valve assembly 36 due to a flow rate or pressure differential above a predetermined limit overcomes the attracting force of the magnet 37 on the valve assembly 36, the valve assembly 36 moves to its closed position to shut off fluid flow and remains in the closed position until pressure differential upstream and downstream is equalized.

Considering now the upstream web member 24 in greater detail with reference to FIG. 2, the upstream web member 24 includes a plurality of holes or apertures, such as an opening 62 and an opening 64, that allows fluid to freely flow from the inlet chamber 28 into the interior chamber 30. A large rod receiving hole 25 is centrally disposed with the upstream web member 24 for facilitating supporting of the magnet 37 for rectilinear movement as will be explained hereinafter in greater detail.

Considering now the translation assembly 34 in greater detail with reference to FIG. 2, the translation assembly 34 generally includes a spring 40 which is supported from below by the upstream web member 24 within the upstream inlet chamber 24. The spring 40 is coupled to a mass 42 by an upper support rod 44 that is attached at its proximal end to a spring plate 41 and at its distal end to a top portion 43 of the mass 42. The support rod 44 extends through the rod receiving hole 25 a sufficient distance to position the mass 42 at about an equal distance from the upstream web member 24 and the downstream web member 26 so the mass 42 can freely oscillate within the interior chamber 30. In order to facilitate unobstructed substantially friction free movement of the rod 44 relative to the hole 25, a bearing sleeve member having a set of bearings (not shown) is mounted within the hole 25.

As best seen in FIG. 2, the magnet 37 is coupled to the mass 42 by a lower support rod 46 that extends along the longitudinal axis (L) of the housing 12 between a bottom portion 45 of the mass 42 and the magnet 37. When at rest, the overall length of the upper support rod 44, the mass 42 and the lower support rod 46 is sufficient to position a bottom portion 48 of the magnet 37 adjacent to the downstream web member 26 so that its magnetic flux travels through the web plate member 26 to exert a sufficient restraining or attracting force against the valve assembly 36 to hold it in its normally open position.

In order to control the rectilinear path of travel followed by the mass 42 and the magnet 37 during lateral movement of the shut off valve assembly 10, the magnet 37 is enclosed within the interior of an elongated housing 49 that is centrally disposed on the downstream web member 26 within the interior chamber 30. The housing 49 is generally cylindrical in shape and is dimensioned to receive therein for relatively friction free rectilinear movement the magnet 37. The housing 49 is attached removable to the downstream web member 26 by conventional means not shown.

The top portion of the housing 49 is threaded for receiving therein a threaded stop 50. The stop 50 form a barrier at the top end of the housing 49 that limits the upward path of travel followed by the magnet 37. In this regard, when the magnet 37 moves under the oscillatory force of the spring 40 and mass 42 it travels along a rectilinear path of travel 52 within the interior of the housing 48. The limits of the path of travel 52 include an upper limit defined by the stop member 50 and a lower limit defined by the downstream web member 26. The overall length of the path of travel 52 is sufficient to cause the valve assembly 36 to move to its closed position when the magnet 37 is disposed at the stop member 50, and to its open position when the magnet 37 is disposed at the downstream web member 26.

Considering now the magnetically actuated valve assembly 36 in greater detail with reference to FIG. 2, the valve assembly 36 generally includes a valve member or annular plate 54 and a valve seat 56 which are both disposed within the outlet chamber 32. The valve seat 56 is an annular shaped wall that projects inwardly a distance (d) from the interior wall 13 of the outlet chamber 32. The valve seat 56 is spaced apart from the downstream web member 26 by a distance (D), where the distance (D) is not a sufficient distance to prevent the valve member 54 from being attracted to the downstream web member 26 when the magnet 37 is disposed adjacent thereto and the valve member 54 is disposed on the seat 56. The distance (D) is however, a sufficient distance to prevent the valve member 54 from being attracted to downstream web member 26 when the magnet 37 is disposed adjacent thereto and the valve member 54 is disposed on the seat 56 and there is a pressure differential of ( ) pounds per square inch applied across the valve member 54. In this regard, when there is the absence of a pressure differential of (P) pounds per square inch applied across the valve member 54, the valve member 54 will be attracted back to its normally closed position when the magnet 37 is disposed adjacent to the downstream web member 26.

From the foregoing those skilled in the art will appreciate that the shut off valve assembly 10 has a dual function. In a first mode of operation, the assembly 10 functions as a fluid shut off valve that prevents the supply of fluid downstream of the assembly 10 whenever the assembly 10 is subjected to a seismic force of at least a predetermined magnitude that causes the magnet 37 to be moved under control of the spring 40 and mass 42 into engagement with the stop 50. In this first mode of operation the shut off valve assembly 10 automatically resets itself when the magnet 37 comes to rest at the downstream web member 26 and there is no downstream leakage to cause a pressure differential of (P) pounds per square inch to be exerted across the valve member 54. Thus whenever such a downstream leak is repaired the shut off valve assembly 10 will automatically rest itself.

In the second mode of operation, whenever a downstream leak or break occurs to cause a pressure differential of at least (P) pounds per square inch to be applied across the valve member 54, the valve member 54 will move to the valve seat 56 and be held their until the pressure differential is eliminated or at least reduce to some pressure below (P) pounds per square inch. Again when the pressure across the valve member 54 is equalized, the magnet 37 will cause the valve member 54 to be moved to its open position adjacent the downstream web member 26.

Considering now the downstream web member 26 in greater detail with reference to FIGS. 2 and 3, the downstream web member 26 is generally circular in shape having a set of equally spaced apart radially inwardly projections 80–83 for defining a set of openings, such as the openings 70–73 that are inwardly spaced from the outer periphery of the web member 26.

The web member 26 is supported from belw by a hollow cylindrically shaped spacer 88 having a height (H) and a diameter (W). The spacer 88 is received in the interior of the housing 12 ain a friction tight fit and is supported from below by a valve set base meber having the upwardly projecting valve seat 56 integrally connected thereo at the interior periphery thereof.

The height (H) of the spacer 88 is selected form spacing the web 26 from the valve seat 56 by a predetermined distance X. In this regard, spacers pf doffetremt jeogts H may be utilized to calibrate the distance X to accomodate magnets having different magnetic strengths for different environmental applications. Thus for example the assembly 10 may be employed not only for earthquake conditions but also for hurricane and tornado conditions. The diameter (W) of the spacer is selected to permit the valve member 54 to slide in a relative friction free manner within the interior chamber 32 defined by the spacer 88.

In order to secur the web 26 within the housing 12, the web 26 is ahesively bonded to the upstream end of the spacer 88 by means not shown. Although the spacer 88 is described as being secured in the housing 12 in a friction tight fit, it is contemplated that a set screw (not shown) passing through the wall of the housing 12 can also be employed to secure the spacer 88 in the interior of the housing 12.

Considering now the valve member 54 in greater detail with reference to FIG. 2, the valve member 54 is a flat annular or circular shaped plate which is dimensioned for relative friction free rectilinear movement within the outlet chamber 32. The valve member 54 has an overall diameter that is substantially greater than the diameter of the annular opening formed by the valve seat 56. In this regard the valve seat 56 functions as a stop to prevent the valve member 54 from passing downstream beyond the valve seat 56.

Referring now to the drawings and more particularly to FIG. 4, there is shown another shut off valve assembly 100 which is constructed in accordance to the present invention. The assembly 100 is substantially similar to the shut off valve assembly 10 except as will be explained hereinafter in greater detail. The shut off valve assembly 100 generally includes a hollow housing member 112 having disposed on its interior an upstream web member 124, and a downstream web member 126 that cooperate with one another to help define a three chamber construction including an upstream or inlet chamber 128, an interior chamber 130 and a downstream or outlet chamber 132. A translation assembly 134 is disposed partially within the upstream and interior chambers 128 and 130 respectively and a magnetically actuated valve assembly 136 is disposed within the downstream chamber 132.

The translation assembly 134 is substantially similar to the translation assembly 34 and includes a mass 142 having a top portion 143 connected to the distal end of an elongated rod 144. The translation assembly 134 further includes another elongated rod 146 which is attached to the mass 142 at its proximal end and which is attached at its distal end to a magnet 137 disposed within an interior housing 149. The housing 149 is integrally connected to the downstream web member 126 and extends perpendicularly upwardly therefrom a sufficient distance D1 to support from below the mass 142. In this regard, a top lip portion 150 of the housing 149 functions as an interior stop that limits the downward path of travel followed by the mass 142 as it travels along a rectilinear path of travel 152 within the interior chamber 130. In order limit the upward path of travel followed by the mass 142, the upstream web member 124 includes a centrally disposed downwardly depending hollow stop member 158 that is disposed in the path of travel 152 followed by the mass 142.

The safety shut off valve assembly 100 operates in substantially the same manner as the safety shut off valve assembly 10 except that the rectilinear path of travel followed by the magnet 137 is limited by the lip 150 and the stop 158 that determine the path of travel limits followed by the mass 142.

Referring now to the drawings and more particularly to FIG. 5, there is shown a safety shut off valve assembly 200 which is constructed in accordance with the present invention. The shut off valve assembly 200 is substantially similar to the valve assembly 10 except as will be explained hereinafter in greater detail. The shut off valve assembly 200 generally includes a hollow housing member 212 having disposed on its interior a downstream web member 226 that helps define a three chamber construction that includes an interior chamber 230 and an outlet chamber 232. A translation assembly 234 is partially disposed within the interior chamber 230 and a magnetically actuated valve assembly 236 is disposed within the downstream chamber 232. The translation assembly 234 includes a magnet 237. The valve assembly 236 is substantially similar to the valve assembly 36 and will not be described hereinafter in greater detail.

The translation assembly 234 is similar to the translation assembly 34 except that it does not include a separate mass, such as the mass 42. Instead as will be explained hereinafter in greater detail, the mass of the translation assembly 234 is confined to the magnet 237.

Considering the translation assembly 234 in greater detail with reference to FIG. 5, the translation assembly 234 includes a spring 240 and a single elongated rod 244 that is coupled at its proximal end to the spring 240 and attached at its distal end to the magnet 237. An interior housing 249 directs the rectilinear path of travel 252 followed by the magnet 237. In order to cause the translation assembly 234 to oscillate in response to a seismic force of a predetermined magnitude, the magnet 237 has a weight of about K kilograms that is substantially equal to the weight of the magnet 37, the mass 42, and the elongated rods 44 and 46 in order to effect substantially the same oscillatory response as exhibited by the translation assembly 34 in response to a seismic force of a predetermined magnitude.

While particular embodiments of the present invention have been disclosed, it is to be understood that various different modifications are possible and are contemplated with the true spirit and scope of the appended claims.

For example different types of materials may be employed for construction of the valve assembly, and such materials may include plastic and metallic materials. It is also contemplated that the valve assembly 10 can be encapsulated within a separate housing in order to insert the assembly within the interior of a existing fluid delivery system.

There is no intention, therefore, of limitations to the exact abstract or disclosure herein presented.

It is claimed:

1. A safety shut off valve for a fluid delivery system, comprising:

a hollow housing for defining a fluid communication path, said housing including an inlet for receiving upstream fluid and an outlet for discharging the received fluid downstream;

an upstream web member mounted within said housing for helping to define an inlet chamber within said housing for receiving fluid from the fluid delivery system;

a downstream web member mounted within said housing for helping to define an outlet chamber within said housing for discharging fluid downstream in the fluid delivery system;

said upstream web member and said downstream web member being space apart from one another for defining an interior chamber within said housing;

a valve seat disposed within said outlet chamber for helping to facilitate the blocking of said communication path;

a movable valve member disposed within said outlet chamber from moving in a rectilinear path of travel along a portion of said fluid communication path between a closed position at said valve seat blocking said fluid communication path and an open position at said downstream web member unlocking said fluid communication path;

a hollow magnet housing supported from below by said downstream web member for helping to define a magnet oscillatory path extending along another portion of said fluid communication path;

a moveable magnet disposed within said magnet housing for moving along said magnet oscillatory path between an attracting position at about said downstream web member and a disengagement position at about a top portion of said magnet housing;

said magnet exerting a sufficient magnetic force to attract and hold said movable valve member in said open position when said magnet is disposed at about said attracting position and not a sufficient magnetic force to attract and hold said valve seat member when disposed at about said disengagement position;

a mass coupled to said magnet for helping to produce a natural frequency of vibration of a sufficient amplitude to move said magnet between said attracting position and said disengagement position, said mass being spaced from said magnet and disposed outside of said magnet housing; and a spring supported from below by said upstream member and coupled to said mass for imparting oscillatory movement to said mass and said magnet in response to a lateral force being exerted against said housing, said lateral force having a predetermined magnitude and another natural frequency;

wherein the movement of said magnet reaches a maximum displacement when the natural frequency of said spring and said mass in combination and the natural frequency of said lateral force are substantially the same.

2. A safety shut off valve according to claim 1, wherein said inlet chamber is a threaded chamber to enable the shut off valve to be coupled into the fluid delivery system.

3. A safety shut off valve according to claim 2, wherein the inlet chamber has external threads.

4. A safety shut off valve according to claim 3, wherein the outlet chamber has external threads.

5. A safety shut off valve according to claim 1, wherein said valve member is a plate member.

6. A safety shut off valve, comprising:

a housing;

a movable valve member mounted for rectilinear movement within said housing for facilitating the control of fluid flow through said housing;

a valve seat for engaging said valve member in a closed position to interrupt fluid flow through said housing;

a movable magnet mounted for rectilinear movement within said housing and having a given mass and magnetic flux for attracting and holding said valve member in an open position when the valve member is in close proximity to said magnet to permit unobstructed fluid flow through said housing; and a spring disposed within said housing and coupled to said magnet for imparting to said magnet axial movement in response to omni directional vibrations of said housing so that said magnet will move a sufficient distance away from said valve member to cause it to disengage from the attracting magnetic forces of said magnet and fall into engagement with said valve seat to block fluid flow through said housing.

7. A safety shut off valve according to claim 6, wherein said housing is a threaded housing to enable the shut off valve to be coupled into a fluid delivery system.

8. A safety shut off valve according to claim 7, wherein said threaded housing has external threads.

9. A safety shut off valve according to claim 7, wherein said threaded housing has internal threads.

10. A safety shut off valve according to claim 6, wherein said valve member is a plate member.

11. A safety shut off valve according to claim 6 wherein said housing is generally cylindrical in shape.

12. A safety shut off valve according to claim 6, further comprising:

a mass coupled to said spring, said mass having a sufficient weight so that said spring and said mass exhibit a natural frequency that corresponds to the natural frequency of a seismic force having said predetermined magnitude.

13. A method of controlling the flow of a fluid, comprising:

attracting a valve member magnetically with a magnet, said magnet exerting a sufficient magnetic force to hold the valve member in an open position when said magnet and said valve member are in close proximity to one another to permit unobstructed fluid flow along a given path;

translating forces exerted directed laterally against said valve member into a directed vibrational force exerted against said magnet;

said directed vibrational force having a natural frequency that corresponds to another natural frequency of a seismic force of a predetermined magnitude;

moving said magnet away from said valve member a given distance in response to a seismic force having a magnitude substantially less than said predetermined magnitude;

said given distance being an insufficient distance to disengage said valve member from the attracting forces of said magnet;

moving said magnet away from said valve member another given distance in response to another seismic force having another magnitude at least equal to said predetermined magnitude; and said another given distance being a sufficient distance to disengage said valve member from the attracting forces of said magnet so the valve member moves to a closed position to block the flow of fluid along said given path.

14. A method of controlling fluid flow according to claim 12, further comprising:

holding said valve member in said closed position when there is a significant atmospheric pressure differential across said valve member;

said significant atmospheric pressure differential exerting a sufficient force against said valve member to prevent it from being moved by said magnet to said open position, and releasing said valve member when there is substantially no atmospheric pressure differential across said valve member atmospheric permitting it to be moved to said closed position by said magnet.

* * * * *